Dec. 20, 1960 D. S. REYNOLDS ET AL 2,965,396
CONDUIT COUPLING
Filed March 19, 1956
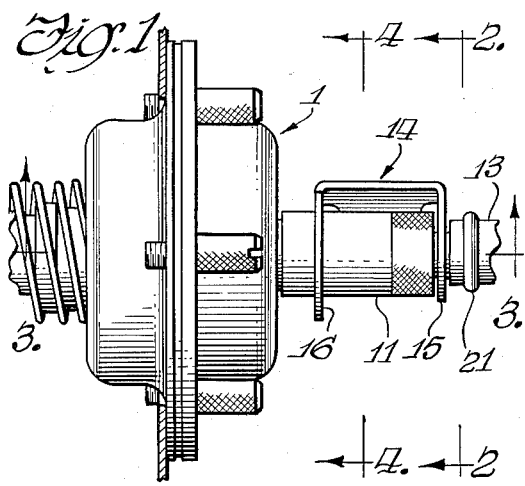
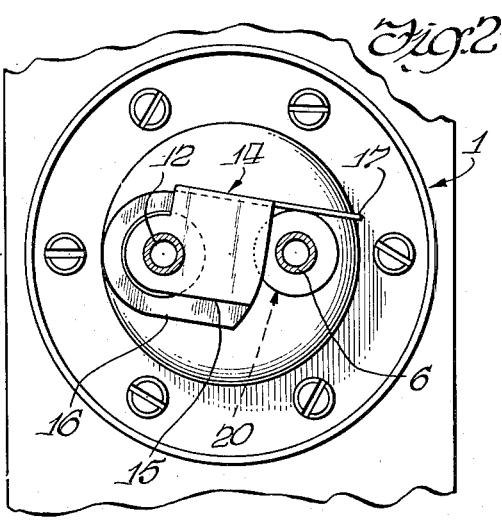
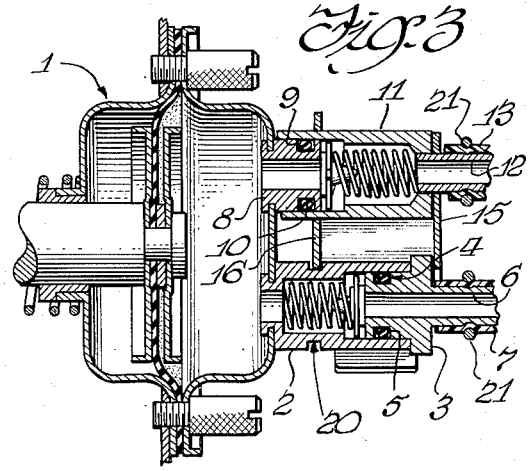
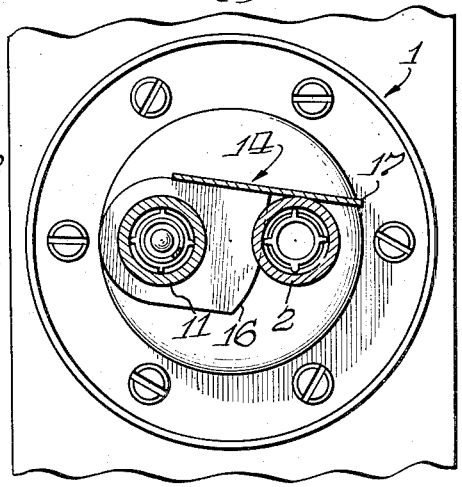
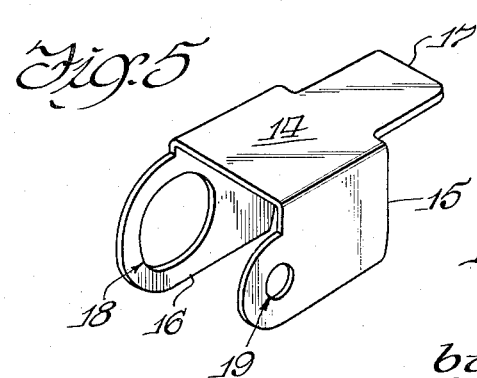
Inventors
Donald S. Reynolds
Robert J. Thorn
by

United States Patent Office 2,965,396
Patented Dec. 20, 1960

2,965,396

CONDUIT COUPLING

Donald S. Reynolds and Robert J. Thorn, Chicago, Ill., assignors to Automatic Canteen Company of America, Chicago, Ill., a corporation of Delaware Filed Mar. 19, 1956, Ser. No. 572,516

1 Claim. (Cl. 285—137)

This invention in general relates to conduit couplings and more particularly to a quick detachable locking device for coupling flexible conduits to a fluid container.

Fluid pump systems which require frequent cleaning such as are used in automatic beverage dispensers normally provide removable conduit connections using conventional threaded unons or friction-type connectors. The threaded connections are troublesome to disconnect and reconnect and are often frozen by the viscous nature of the fluid transmitted. The friction type couplings frequently fail by becoming disconnected when abnormally high pressures are encountered in the fluid system.

The above difficulties are completely overcome by the use of the present coupling which assures both positive locking and quick detachment of conduits by the employment of a threadless leakproof junction which may be disconnected and reconnected without tools and with a minimum of manual effort thus providing the principal object of the invention.

A further object of the invention is the provision of a pressure-friction sealed coupling for conduits including a coacting lever means for locking and unlocking said coupling.

These and other objects and advantages in one embodiment of the invention are described and shown in the following specification and drawings in which Fig. 1 is a side elevation of a fluid pump showing the conduit couplings intelescopic engagement;

Fig. 2 is a view of the pump and coupling taken through section line 2—2 Fig. 1;

Fig. 3 is a cross sectional view of the pump and coupling taken through section line 3—3 Fig. 1;

Fig. 4 is a view of the pump and coupling taken through section line 4—4 Fig. 1;

Fig. 5 is a perspective view of the locking member of the coupling shown in Figs. 1 to 4 inclusive.

Referring to Figs. 1 and 2, the conduit coupling is shown applied to a mounting member comprising a fluid pump assembly 1 and is a typical application in which the advantages of the coupling are fully realized. The pump and its inlet and outlet passages are described in detail in our pending U.S. patent application Serial No. 549,002.

This application of couplings also illustrates their non-interchangeable use to assure proper mating connections of the inlet and outlet conduits to their corresponding fittings.

The inlet coupling consists of a hollow cylindrical female fitting 2 hermetically secured at one end in the pump casing. A male removable coupling 3 is slidably engaged in the bore of fitting 2, as shown, and is provided with an annular groove 4 for loosely retaining a resilient sealing ring 5 commonly called an O ring.

The outer end of member 3 terminates in a tube 6 over which an inlet conduit 7 is secured by well known means as shown. When the member 3 is inserted into fitting 2 the O ring will compress sufficiently to provide a hermetic seal between the parts. The outlet coupling is provided with a male fitting 8 mounted in parallel, side-by-side relationship to fitting 3 and hermetically secured at one end in a pump casing, and like member 3, has an annular groove 9 which retains an O ring 10. A cylindrical coupling 11 is adapted to slide over member 8 and provide hermetic seal by compression of the O ring 10. The coupling 11 has a coaxial tubular extension 12 at one end to which the flexible outlet conduit 13 is secured.

Referring to Fig. 5, a U shaped, dual arm locking member 14 is formed to provide a pair of parallel, rigidly interconnected spaced ears or arms 15 and 16 and operating tab 17. Ear or arm 16 is provided with a circular opening 18 for freely engaging housing 11. Ear or arm 15 has an opening 19 coaxial with opening 18 for engaging the extension tube 12 of housing, best shown in Figs. 1 and 2. When the member 14 is pivotally mounted on the assembled fitting and coupling and moved into locked position, as shown, the edge of ear 16 comprises a latch means which will engage a shoulder of annular groove 20 shown Figs. 2 and 3 and comprising a catch for the latch.

In operation and referring to Fig. 1, the coupling and lock therefor are shown attached to a pump casing with the conduit 13 secured to coupling 11 by well known clamp means 21. It is apparent from Fig. 3 that the compressed O ring 9 provides a hermetic seal between coupling 11 and male member 8 and the locking member 14 is pivoted for movement about assembled fitting and coupling 8—11. The lower coupling shown Fig. 3 is constructed in reverse of the upper coupling in that fitting 2 secured to the pump is adapted to receive male member 3 and the tube 6 thereof is permanently secured to the inlet conduit 7 by clamp means 21. The compression of O ring 5 provides a hermetic seal between fitting 2 and member 3.

It is further shown in Figs. 2, 3 and 4 that the ear or arm 16 of the locking member 14 is in engagement with groove 20 in fitting 2, and also the ear 15 of locking member 14 is positioned in abutting engagement with the outer shoulder of member 3. Thus by virtue of engagement with groove 20, the locking member by engagement with shoulders on both couplings 3—11 firmly holds the couplings in proper position with respect to the pump 1 and prevents them from disengaging from their respective fittings.

When the locking member 14 shown Fig. 2 is rotated in a counterclockwise direction, ears 15 and 16 will disengage from groove 20 and shoulder of member 3 and thus provide for the simple longitudinal removal of both couplings from the pump. It is apparent that in replacing the decoupled conduits, the couplings are merely pushed into proper engagement with their corresponding fittings and the lock member rotated into position shown in Fig. 2.

In the event a single conduit is coupled to a container, then an abutment simulating housing 2 must be secured to the container for engagement by the locking member.

It should be noted that various modifications of the couplings described are applicable to other devices where a single conduit or predetermined pairs of conduits require non-interchangeable attachment and are intended to come within the scope of the following claim.

Having described our invention, we claim:

A quick detachable coupling means comprising a pair of fittings; a pair of couplings telescopically engaging at one end thereof said fittings; each coupling having a shoulder at the other end thereof; one of said fittings having catch means thereon; and a locking member pivotally mounted about the other assembled fitting and coupling and having two rigidly interconnected arms, one of said arms in the locking position having a part removably engaging said catch means and having an aperture therein, the assembled coupling and fitting extending through said aperture, and the other of said arms having an aperture, said last-mentioned coupling extending through said last-mentioned aperture with the side of said arm adjacent the aperture in abutting engagement with the shoulder on said coupling, the other of said arms having an extension removably engaging the shoulder of the other coupling when said locking member is in locking position.

References Cited in the file of this patent

UNITED STATES PATENTS

| | | |
|---|---|---|
| 1,227,563 | Allen | May 29, 1917 |
| 1,709,751 | Shipley | Apr. 16, 1929 |
| 1,724,822 | Brown | Aug. 13, 1929 |
| 1,993,243 | Kennedy | Mar. 5, 1935 |
| 2,512,939 | Hollerith | June 27, 1950 |
| 2,596,020 | Fletcher et al. | May 6, 1952 |
| 2,672,924 | Anthes | Mar. 23, 1954 |
| 2,709,598 | Retz | May 31, 1955 |

FOREIGN PATENTS

| | | |
|---|---|---|
| 177,339 | Switzerland | May 31, 1935 |